United States Patent
Sutton

(10) Patent No.: US 9,013,305 B2
(45) Date of Patent: Apr. 21, 2015

(54) BIDIRECTIONAL SINGLE-PIN ALARM INTERFACE

(71) Applicant: QUALCOMM Incorporated, San Diego, CA (US)

(72) Inventor: Todd R Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/782,299

(22) Filed: Mar. 1, 2013

(65) Prior Publication Data

US 2013/0278421 A1    Oct. 24, 2013

Related U.S. Application Data

(60) Provisional application No. 61/635,087, filed on Apr. 18, 2012.

(51) Int. Cl.
| | |
|---|---|
| G08B 21/00 | (2006.01) |
| H04B 1/38 | (2006.01) |
| G08B 1/08 | (2006.01) |
| G06F 11/07 | (2006.01) |
| G06F 13/42 | (2006.01) |

(52) U.S. Cl.
CPC .............. *G08B 1/08* (2013.01); *G06F 11/0736* (2013.01); *G06F 11/0772* (2013.01); *G06F 13/4291* (2013.01)

(58) Field of Classification Search
CPC ............................. G06F 11/0736; G08B 1/08
USPC ........................................ 340/540; 455/558
See application file for complete search history.

(56) References Cited

U.S. PATENT DOCUMENTS

| | | | |
|---|---|---|---|
| 7,117,022 B2 * | 10/2006 | Kang | ............................. 455/574 |
| 7,948,720 B2 | 5/2011 | Mok et al. | |
| 7,974,317 B2 | 7/2011 | Maldonado et al. | |
| 8,103,817 B2 | 1/2012 | Chi et al. | |
| 8,121,643 B2 | 2/2012 | Lin et al. | |
| 2005/0036397 A1 | 2/2005 | Yeh et al. | |
| 2007/0103876 A1 * | 5/2007 | Huang et al. | .................. 361/737 |
| 2009/0280865 A1 | 11/2009 | Danis et al. | |

* cited by examiner

*Primary Examiner* — Steven Lim
*Assistant Examiner* — Omeed Alizada

(57) ABSTRACT

An apparatus configured for providing communication between integrated circuits is disclosed. The apparatus includes a first integrated circuit. The apparatus also includes a second integrated circuit. The apparatus further includes an alarm interface that couples the first integrated circuit to the second integrated circuit. An alarm signal is sent on the alarm interface to signal an alarm event. The alarm signal is modulated differently based on a type of the alarm event.

37 Claims, 11 Drawing Sheets

BIDIRECTIONAL SINGLE-PIN ALARM INTERFACE

CLAIM OF PRIORITY UNDER 35 U.S.C. 119

The present application for patent claims priority to Provisional Application No. 61/635,087, entitled "Bi-directional PMIC/MSM alarm interface" filed Apr. 18, 2012, and assigned to the assignee hereof and hereby expressly incorporated by reference herein.

TECHNICAL FIELD

The present disclosure relates generally to wireless devices for communication systems. More specifically, the present disclosure relates to systems and methods for a bidirectional single-pin alarm interface.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

An electronic device may include one or more integrated circuits. These integrated circuits may include analog and digital circuitry necessary for wireless communication.

As electronic devices become more expensive, designers look to reduce costs by reducing the number of components and/or the board area used by components. If a component can be removed or shared, the cost of the electronic device may be reduced. By integrating components onto integrated circuits, electronic devices may be built that are smaller, faster, cheaper and that use less power. However, such integrated circuits have a limited number of pins for access to the circuitry. Thus, benefits may be realized by using circuitry that provides access to circuitry without requiring the use of additional pins.

SUMMARY

An apparatus configured for providing communication between integrated circuits is described. The apparatus includes a first integrated circuit, a second integrated circuit and an alarm interface that couples the first integrated circuit to the second integrated circuit. An alarm signal is sent on the alarm interface to signal an alarm event. The alarm signal is modulated differently based on a type of the alarm event.

The first integrated circuit may be a first type and the second integrated circuit may be a second type. The apparatus may be a wireless communication device. The alarm interface may be coupled between a single pin on the first integrated circuit and a single pin on the second integrated circuit. The first integrated circuit may be a power management integrated circuit. The second integrated circuit may be a modem integrated circuit.

The first integrated circuit may include a clock module, a first D flip-flop, a first negative edge triggered D flip-flop and a first P-channel transistor. The clock module may provide a sleep clock signal to the first D flip-flop and the first negative edge triggered D flip-flop. The first D flip-flop may provide a battery alarm out signal to a gate of the first P-channel transistor. The first negative edge triggered D flip-flop may receive an alarm in signal from a drain of the first P-channel transistor via a driver. The drain of the first P-channel transistor may be coupled to the alarm interface.

The second integrated circuit may include a second D flip-flop, a second negative edge triggered D flip-flop and a second P-channel transistor. The clock module may provide a sleep clock signal to the second D flip-flop and the second negative edge triggered D flip-flop via a driver on the first integrated circuit and a first driver on the second integrated circuit. The first D flip-flop may provide a universal integrated circuit card alarm out signal to a gate of the second P-channel transistor. The second negative edge triggered D flip-flop may receive an alarm in signal from a drain of the second P-channel transistor via a second driver on the second integrated circuit. The drain of the second P-channel transistor may be coupled to the alarm interface.

The apparatus may include a third integrated circuit. The alarm interface may couple the first integrated circuit to the third integrated circuit. The third integrated circuit may include a third D flip-flop, a third negative edge triggered D flip-flop, a third P-channel transistor, a fourth D flip-flop, a fourth negative edge triggered D flip-flop and a fourth P-channel transistor.

The clock module may provide a sleep clock signal to the third integrated circuit via a driver on the first integrated circuit. The driver on the first integrated circuit may provide the sleep clock signal to the third D flip-flop and the third negative edge triggered D flip-flop via a first driver on the third integrated circuit. The driver on the first integrated circuit may also provide the sleep clock signal to the fourth D flip-flop and the fourth negative edge triggered D flip-flop via a second driver on the third integrated circuit. The third D flip-flop may provide a first universal integrated circuit card alarm out signal to a gate of the third P-channel transistor. The fourth D flip-flop may provide a second universal integrated circuit card alarm out signal to a gate of the fourth P-channel transistor. The third negative edge triggered D flip-flop may receive a first alarm in signal from a drain of the third P-channel transistor via a third driver on the third integrated circuit. The fourth negative edge triggered D flip-flop may receive a second alarm in signal from a drain of the fourth P-channel transistor via a fourth driver on the third integrated circuit.

The drain of the third P-channel transistor and the drain of the fourth P-channel transistor may be coupled to the alarm interface. The first integrated circuit may be a power management integrated circuit. The second integrated circuit may be an applications processor. The third integrated circuit may be a modem processor.

The first integrated circuit may include a clock module, a first D flip-flop, a first negative edge triggered D flip-flop and an N-channel transistor. The second integrated circuit may include a second D flip-flop, a second negative edge triggered D flip-flop and a P-channel transistor. The clock module may provide a sleep clock signal to the second D flip-flop and the second negative edge triggered D flip-flop via a driver on the first integrated circuit and a first driver on the second integrated circuit. The first D flip-flop may provide a universal integrated circuit card alarm out signal to the gate of the N-channel transistor. The second negative edge triggered D flip-flop may receive an alarm in signal from the drain of the P-channel transistor via a second driver on the second integrated circuit.

The type of alarm event may be one of a universal integrated circuit card being removed from the apparatus, a subscriber identification module card being removed from the apparatus, a secure digital card being removed from the apparatus, and a battery being removed from the apparatus. The alarm interface for each integrated circuit may be implemented with hardware or with software. The alarm signal may be modulated using one of pulse width modulation, pulse position modulation and frequency modulation.

A method for providing communication between integrated circuits is also described. An alarm signal is received via an alarm interface. The alarm signal is sent on the alarm interface to signal an alarm event. The alarm signal is modulated differently based on a type of the alarm event. A modulation of the alarm signal is determined. The type of the alarm event of the alarm signal is determined using the modulation.

The method may be performed by a first integrated circuit. The alarm signal may be received from a second integrated circuit.

A method for providing communication between integrated circuits is described. An alarm event is detected by a first integrated circuit. An alarm signal is generated that is modulated based on a type of the alarm event. The alarm signal is sent to a second integrated circuit via an alarm interface.

An apparatus for providing communication between integrated circuits is also described. The apparatus includes means for receiving an alarm signal via an alarm interface. The alarm signal is sent on the alarm interface to signal an alarm event. The alarm signal is modulated differently based on a type of the alarm event. The apparatus also includes means for determining a modulation of the alarm signal. The apparatus further includes means for determining the type of the alarm event of the alarm signal using the modulation.

An apparatus for providing communication between integrated circuits is described. The apparatus includes means for detecting an alarm event by a first integrated circuit. The apparatus also includes means for generating an alarm signal that is modulated based on a type of the alarm event. The apparatus further includes means for sending the alarm signal to a second integrated circuit via an alarm interface.

A computer-program product for providing communication between integrated circuits is also described. The computer-program product includes a non-transitory computer-readable medium having instructions thereon. The instructions include code for causing a first integrated circuit to receive an alarm signal via an alarm interface. The alarm signal is sent on the alarm interface to signal an alarm event. The alarm signal is modulated differently based on a type of the alarm event. The instructions also include code for causing the first integrated circuit to determine a modulation of the alarm signal. The instructions further include code for causing the first integrated circuit to determine the type of the alarm event of the alarm signal using the modulation.

A computer-program product for providing communication between integrated circuits is described. The computer-program product includes a non-transitory computer-readable medium having instructions thereon. The instructions include code for causing a first integrated circuit to detect an alarm event by a first integrated circuit. The instructions also include code for causing the first integrated circuit to generate an alarm signal that is frequency modulated based on a type of the alarm event. The instructions further include code for causing the first integrated circuit to send the alarm signal to a second integrated circuit via an alarm interface.

DETAILED DESCRIPTION

Figure 1:
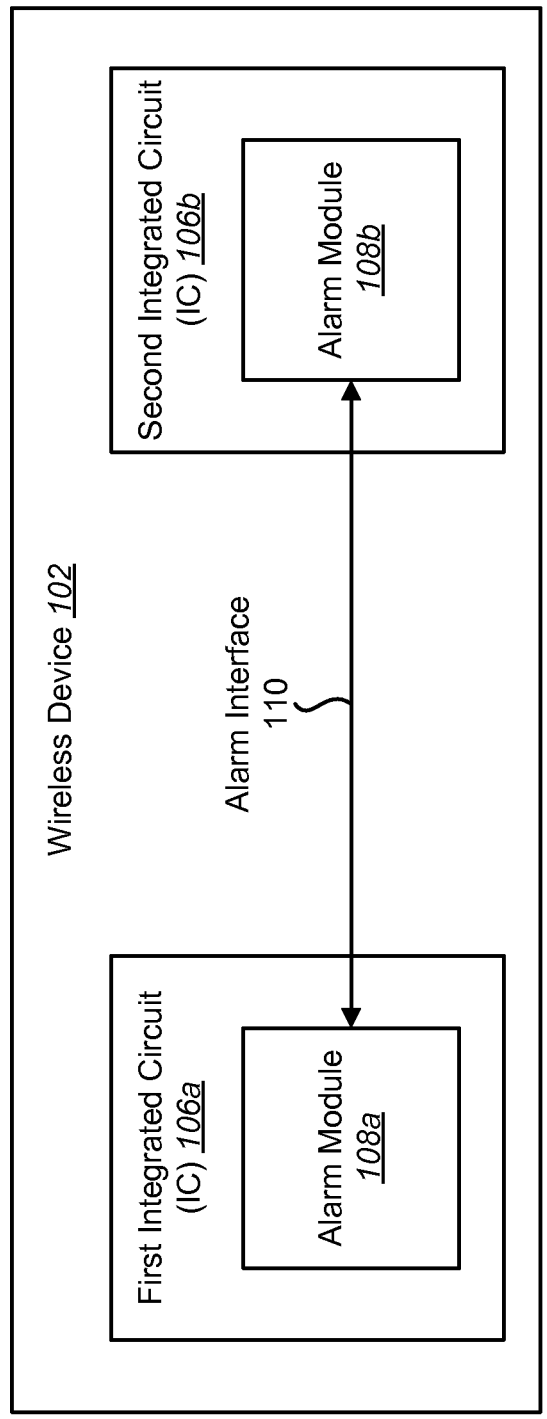
FIG. 1 shows a wireless device for use in the present systems and methods.

FIG. 1 shows a wireless device 102 for use in the present systems and methods. A wireless device 102 may be a wireless communication device or a base station. A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. A wireless communication device may communicate with zero, one or multiple base stations on a downlink and/or an uplink at any given moment. The downlink (or forward link) refers to the communication link from a base station to a wireless communication device, and the uplink (or reverse link) refers to the communication link from a wireless communication device to a base station. Uplink and downlink may refer to the communication link or to the carriers used for the communication link.

A wireless communication device may operate in a wireless communication system that includes other wireless devices 102, such as base stations. A base station is a station that communicates with one or more wireless communication devices. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3$^{rd}$ Generation Partnership Project (3GPP) Long Term Evolution (LTE) systems and spatial division multiple access (SDMA) systems.

The wireless device 102 may include multiple integrated circuits (ICs) 106a-b. For example, the wireless device 102 may include a first integrated circuit (IC) 106a and a second integrated circuit (IC) 106b. In one configuration, the first integrated circuit (IC) 106a may be a power management integrated circuit (PMIC) and the second integrated circuit (IC) 106b may be an application-specific integrated circuit (ASIC). One example of an application-specific integrated circuit (ASIC) is a mobile station modem (MSM).

The first integrated circuit (IC) 106a and the second integrated circuit (IC) 106b may each include an alarm module 108a-b. The alarm modules 108 may allow bidirectional communication of an alarm signal between the first integrated circuit (IC) 106a and the second integrated circuit (IC) 106b. The alarm signal may be sent between the integrated circuits (ICs) 106 using an alarm interface 110. In one configuration, the alarm interface 110 may be a single pin alarm (i.e., the alarm interface may be a single wire coupled between a single pin on the first integrated circuit (IC) 106a and a single pin on the second integrated circuit (IC) 106b). The alarm interface 110 may allow for the integrated circuits (ICs) 106 to send a quick indication of an alarm that has occurred. The alarm interface 110 may be implemented between each integrated circuit 106 using hardware and/or software.

The alarm signal may include information about the type of alarm being signaled. For example, the alarm signal may indicate that a universal integrated circuit card (UICC), subscriber identification module (SIM) card or Secure Digital (SD) card has been removed or inserted. A universal integrated circuit card (UICC) is a smart card that may be used in wireless devices in both Global Systems for Mobile Communications (GSM) and Universal Mobile Telecommunications System (UMTS) networks. A wireless device 102 may have multiple universal integrated circuit cards (UICCs). The wireless device 102 may be capable of hot swapping; universal integrated circuit cards (UICCs) may be inserted or removed without shutting down the wireless device 102. The alarm signal may be modulated using pulse-frequency modulation (PFM) or pulse-width modulation (PWM).

The mobile station modem (MSM) may need to notify the power management integrated circuit (PMIC) that the universal integrated circuit card (UICC), SIM card or SD card has been removed so that the power management integrated circuit (PMIC) can drive the appropriate voltage rail to ground. The digital interface between the mobile station modem (MSM) (e.g., the single-wire serial bus interface (SSBI), the I2C bus, the system management bus (SMBus) and the system performance measurement interface (SPMI)) and the power management integrated circuit (PMIC) may be too slow (~30 milliseconds (ms)), especially when the mobile station modem (MSM) is asleep, resulting in damage or errors written in non-volatile memory. Likewise, the power management integrated circuit (PMIC) needs to quickly inform the mobile station modem (MSM) when the battery (e.g., a phone battery or a tablet battery) is removed to prevent damage or errors written in non-volatile memory.

When the wireless device 102 is in sleep mode, it may take 20 to 30 milliseconds (ms) for the software to wake up, signal the power management integrated circuit (PMIC) to adjust the appropriate logic and memory rails, turn the system clock on, process the interrupt and signal the power management integrated circuit (PMIC) to shut down the universal integrated circuit card (UICC) rail. This is extremely slow and can lead to damage to the universal integrated circuit card (UICC). An expensive solution is to connect the universal integrated circuit card (UICC) inserted signal to both the mobile station modem (MSM) and the power management integrated circuit (PMIC). However, this wastes 1 pin per interface on the power management integrated circuit (PMIC). Since the mobile station modem (MSM) may target three or more universal integrated circuit cards (UICCs), it may be prohibitive to use three pins on the power management integrated circuit (PMIC).

The alarm module 108 of the present systems and methods may require only 2 ms total time (from detection to shutdown) (and may be as low as 100 microseconds μs) for optimized designs) and may be implemented using a few flip-flops, logic and drivers. Furthermore, the alarm module may require only 1 pin on the power management integrated circuit (PMIC). The alarm interface 110 may be a bi-directional alarm interface 110 that is implemented using a single pin alarm and the implied 32 kilohertz (kHz) sleep clock (other sleep clock frequencies may be used, as long as the sleep clock frequency is at least twice as fast as the SIM card removal requirements). The alarm interface 110 may be OR'd between the first integrated circuit (IC) 106a and the second integrated circuit (IC) 106b. The alarm signal may last about 1 ms. The frequency content of the alarm signal may inform the other modules what type of alarm is being signaled. The alarm signal may support a large number of different alarms (for example, one configuration may support up to 13 alarms, while another configuration may support up to 15 alarms). The alarm module 108 may be implemented in the power management integrated circuit (PMIC), modem modules, universal integrated circuit card (UICC) controller modules, application processors, near field communication (NFC) controllers, etc.

Figure 2:
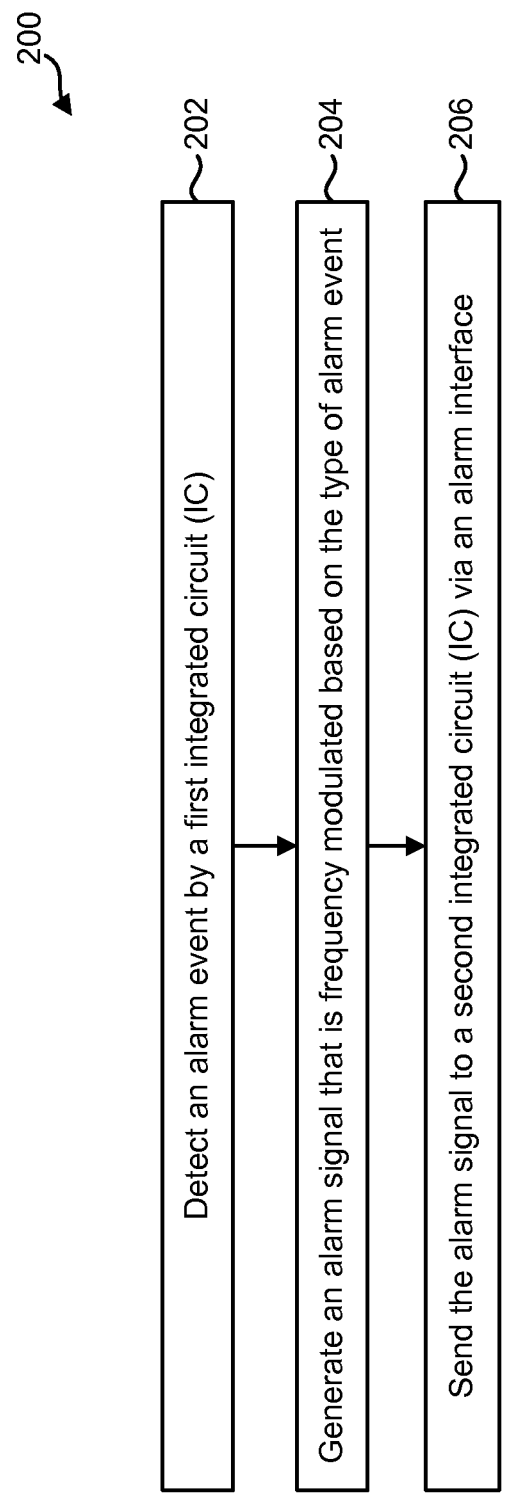
FIG. 2 is a flow diagram of a method for signaling an alarm event using a single pin alarm interface.

FIG. 2 is a flow diagram of a method 200 for signaling an alarm event using a single pin alarm interface 110. The method 200 may be performed by a first integrated circuit (IC) 106a on a wireless device 102. For example, the method 200 may be performed by a power management integrated circuit (PMIC) or a mobile station modem (MSM) on the wireless device 102.

The first integrated circuit (IC) 106a may detect 202 an alarm event. The alarm event may be the ejection of a battery, the ejection of a hotswappable universal integrated circuit card (UICC) or the insertion of a hotswappable universal integrated circuit card (UICC). The first integrated circuit (IC) 106a may generate 204 an alarm signal that is modulated (e.g., frequency modulated, pulse width modulated, pulse position modulated or any other modulation) based on the type of alarm event. An example of the frequency modulations for different types of alarm events is given in Table 1 below.

TABLE 1

| Alarm Event Type/Alarm ID# | Alarm Frequency (kHz) | Alarm Period (usec) | Total Detection Time (usec) |
|---|---|---|---|
| Battery Alarm 0 | — | — | 122.07 |
| UICC# 1 | 16.38 | 61.04 | 183.11 |
| UICC# 2 | 10.92 | 91.55 | 213.62 |
| UICC# 3 | 8.19 | 122.07 | 244.14 |
| UICC# 4 | 6.55 | 152.59 | 274.66 |
| TBD# 5 | 5.46 | 183.11 | 305.18 |
| TBD# 6 | 4.68 | 213.62 | 335.69 |
| TBD# 7 | 4.10 | 244.14 | 366.21 |
| TBD# 8 | 3.64 | 274.66 | 396.73 |
| TBD# 9 | 3.28 | 305.18 | 427.25 |
| TBD# 10 | 2.98 | 335.69 | 457.76 |
| TBD# 11 | 2.73 | 366.21 | 488.28 |
| TBD# 12 | 2.52 | 396.73 | 518.80 |
| TBD# 13 | 2.34 | 427.25 | 549.32 |
| TBD# 14 | 2.18 | 457.76 | 579.83 |
| TBD# 15 | 2.05 | 488.28 | 610.35 |

The first integrated circuit (IC) 106a may then send 206 the alarm signal to a second integrated circuit (IC) 106b via an alarm interface 110. For example, if the first integrated circuit (IC) 106a is a power management integrated circuit (PMIC), the power management integrated circuit (PMIC) may send the alarm signal to a mobile station modem (MSM) via the alarm interface 110. In one configuration, the power management integrated circuit (PMIC) may send the alarm signal to multiple mobile station modems (MSMs). As another example, if the first integrated circuit (IC) 106a is a mobile station modem (MSM), the mobile station modem (MSM) may send the alarm signal to a power management integrated circuit (PMIC).

Figure 3:
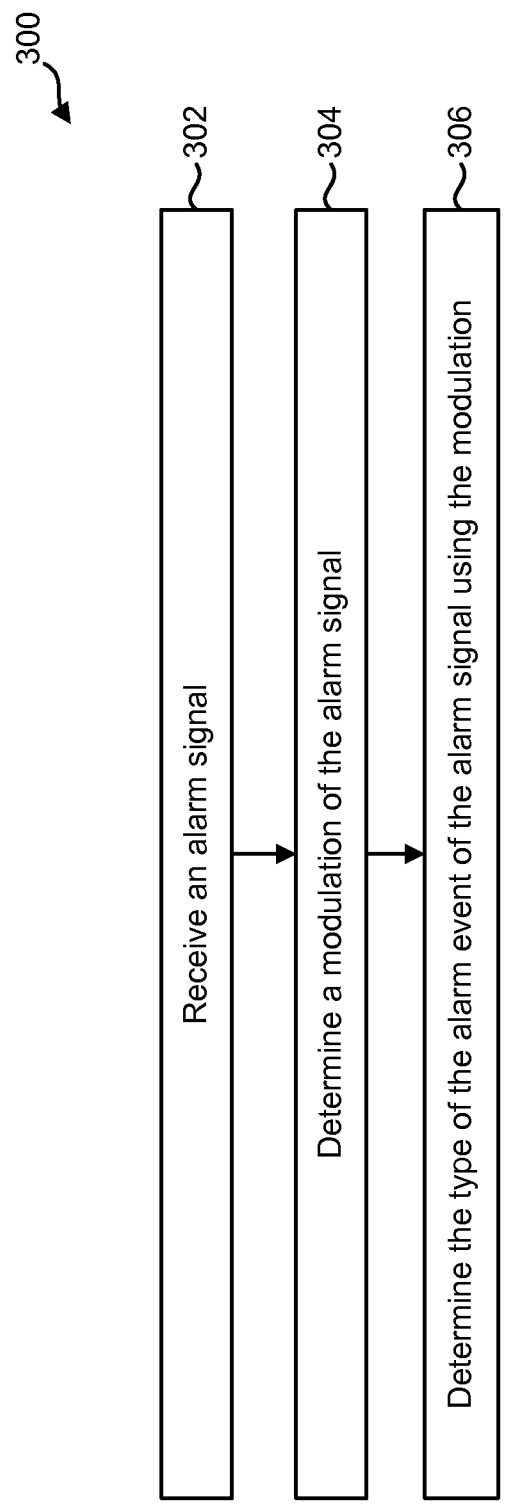
FIG. 3 is a flow diagram of a method for receiving an alarm signal using a single pin alarm interface.

FIG. 3 is a flow diagram of a method 300 for receiving an alarm signal using a single pin alarm interface 110. The method 300 may be performed by a first integrated circuit (IC) 106a on a wireless device 102. For example, the first integrated circuit (IC) 106a may be a power management integrated circuit (PMIC) or a mobile station modem (MSM). The first integrated circuit (IC) 106a may receive 302 an alarm signal. The alarm signal may be received via an alarm interface 110 from a second integrated circuit (IC) 106b. The first integrated circuit (IC) 106a may determine 304 a modulation (e.g., frequency modulation, pulse width modulation, pulse position modulation or other modulation) of the alarm signal. The first integrated circuit (IC) 106a may then determine 306 the type of the alarm event of the alarm signal using the modulation. For example, if the modulation is frequency modulation, the first integrated circuit (IC) 106a may use Table 1 to determine 306 the alarm event type/alarm ID based on the alarm frequency and the alarm period.

Figure 4A:
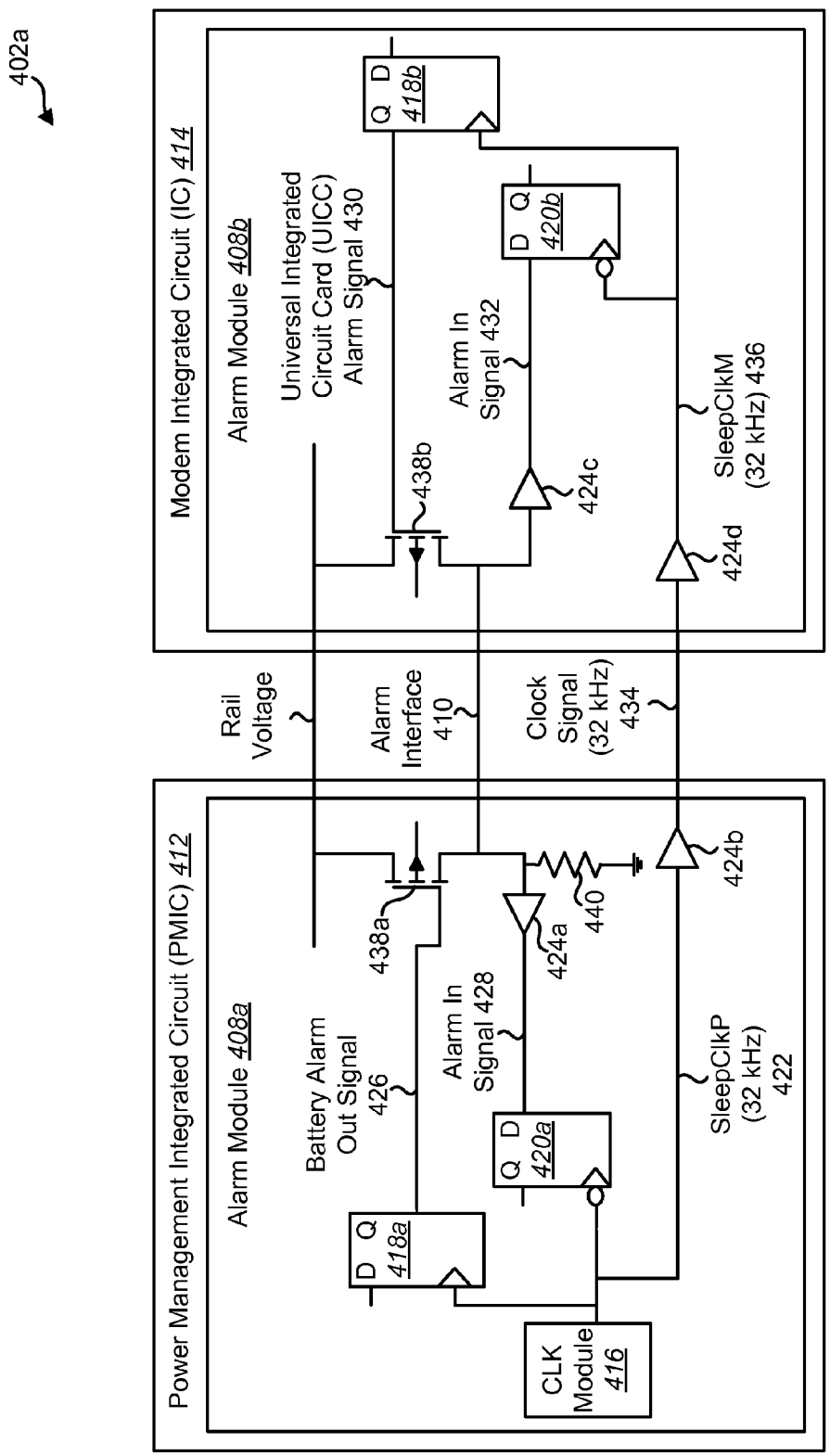
FIG. 4A is a block diagram illustrating a wireless device for use in the present systems and methods.

FIG. 4A is a block diagram illustrating a wireless device 402a for use in the present systems and methods. The wireless device 402a of FIG. 4A may be one configuration of the wireless device 102 of FIG. 1. The wireless device 402a may include a power management integrated circuit (PMIC) 412 and a modem integrated circuit (IC) 414.

The power management integrated circuit (PMIC) 412 may include an alarm module 408a. The alarm module 408a may include a D flip-flop 418a, a negative edge triggered D flip-flop 420a and a CLK module 416. The CLK module 416 may generate a clock signal SleepCLKP 422 that is 32 kilohertz (kHz). The CLK module 416 may provide the clock signal SleepCLKP 422 to both the D flip-flop 418a and the negative edge triggered D flip-flop 420a. The D flip-flop 418a may provide a battery alarm out signal 426. The battery alarm out signal 426 may thus be an alarm signal generated by the power management integrated circuit (PMIC) 412. The battery alarm out signal 426 may be provided to the gate of a P-channel metal-oxide-semiconductor field-effect-transistor (MOSFET) 438a. The source of the P-channel MOSFET 438a may be coupled to a rail voltage. The drain of the P-channel MOSFET 438a may be coupled to an alarm interface 410 that couples the power management integrated circuit (PMIC) 412 to the modem integrated circuit 414.

The drain of the P-channel MOSFET 438a may also be coupled to ground via a resistor 440. The drain of the P-channel MOSFET 438a may further be coupled to an input of a driver 424a. The output of the driver 424a may be coupled to the negative edge triggered D flip-flop 420a. The driver 424a may thus provide an alarm in signal 428 to the negative edge triggered D flip-flop 420a.

The power management integrated circuit (PMIC) 412 and the modem integrated circuit (IC) 414 may share the rail voltage, the alarm interface 410 and a clock signal 434. The sleep CLKP signal 422 may be passed through a driver 424b (i.e., buffer) on the alarm module 408a of the power management integrated circuit (PMIC) 412 to obtain a clock signal 434. The clock signal 434 may then be provided to the modem integrated circuit (IC) 414. The clock signal 434 may be passed through a driver 424d (i.e., buffer) on the alarm module 408b of the modem integrated circuit (IC) 414 to obtain a SleepCLKM signal 436. The SleepCLKM signal 436 may be provided to a D flip-flop 418b and a negative edge triggered D flip-flop 420b on the alarm module 408b of the modem integrated circuit (IC) 414.

The alarm module 408b may include a P-channel MOSFET 438b. The source of the P-channel MOSFET 438b may be coupled to the rail voltage. The gate of the P-channel MOSFET 438b may be coupled to an output of the D flip-flop 418b. The D flip-flop 418b may thus provide a universal integrated circuit card (UICC) alarm out signal 430 to the P-channel MOSFET 438b. The drain of the P-channel MOSFET 438b may also be coupled to the alarm interface 410. The drain of the P-channel MOSFET 438b may also be coupled to the input of a driver 424c. The output of the driver 424c may be coupled to an input of the negative edge triggered D flip-flop 420b. The driver 424c may thus provide an alarm in signal 432 to the negative edge triggered D flip-flop 420b.

Figure 4B:
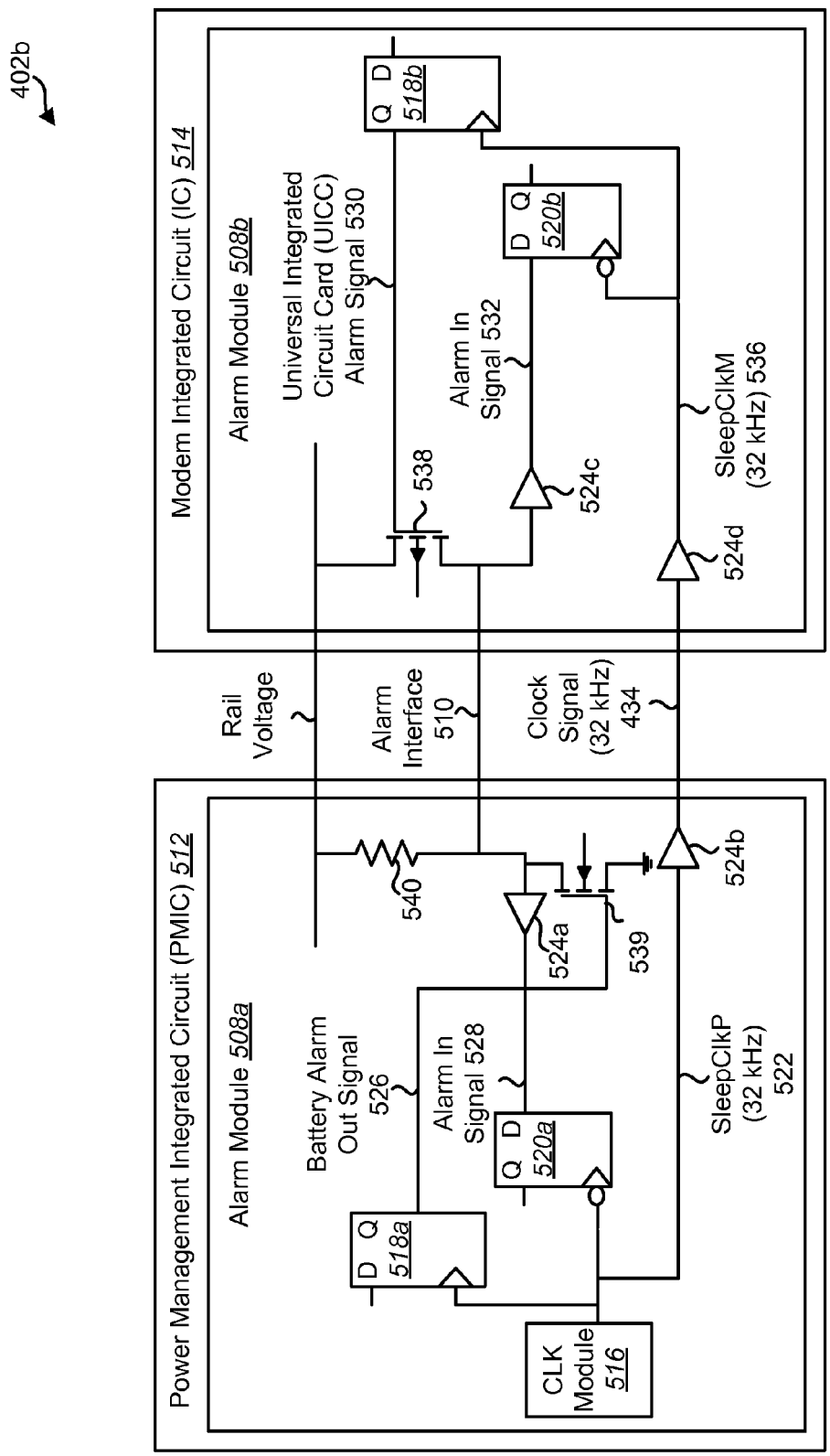
FIG. 4B is a block diagram illustrating another wireless device for use in the present systems and methods.

FIG. 4B is a block diagram illustrating another wireless device 402b for use in the present systems and methods. The wireless device 402b of FIG. 4B may be one configuration of the wireless device 102 of FIG. 1. The wireless device 402b may include a power management integrated circuit (PMIC) 512 and a modem integrated circuit (IC) 514. The wireless device 402b may include similar components as the wireless device 402a.

The power management integrated circuit (PMIC) 512 may include an alarm module 508a. The alarm module 508a may include a D flip-flop 518a, a negative edge triggered D flip-flop 520a and a CLK module 516. The CLK module 516 may generate a clock signal SleepCLKP 522 that is 32 kilohertz (kHz). The CLK module 516 may provide the clock signal SleepCLKP 522 to both the D flip-flop 518a and the negative edge triggered D flip-flop 520a. The D flip-flop 518a may provide a battery alarm out signal 526. The battery alarm out signal 526 may thus be an alarm signal generated by the power management integrated circuit (PMIC) 512. The battery alarm out signal 526 may be provided to the gate of an N-channel metal-oxide-semiconductor field-effect-transistor (MOSFET) 539. The source of the N-channel MOSFET 539 may be coupled to ground. The drain of the N-channel MOSFET 539 may be coupled to an alarm interface 510 that couples the power management integrated circuit (PMIC) 512 to the modem integrated circuit 514.

The drain of the N-channel MOSFET 539 may also be coupled to the rail voltage via a resistor 540. The N-channel MOSFET 539 may then be used to pull the wire low during alarm events (and thus the alarm module 508a is active low instead of active high). The drain of the N-channel MOSFET 539 may further be coupled to an input of a driver 524a. The output of the driver 524a may be coupled to the negative edge triggered D flip-flop 520a. The driver 524a may thus provide an alarm in signal 528 to the negative edge triggered D flip-flop 520a.

The power management integrated circuit (PMIC) 512 and the modem integrated circuit (IC) 514 may share the rail voltage, the alarm interface 510 and a clock signal 434. The sleep CLKP signal 522 may be passed through a driver 524b (i.e., buffer) on the alarm module 508a of the power management integrated circuit (PMIC) 512 to obtain a clock signal 434. The clock signal 434 may then be provided to the modem integrated circuit (IC) 514. The clock signal 434 may be passed through a driver 524d (i.e., buffer) on the alarm module 508b of the modem integrated circuit (IC) 514 to obtain a SleepCLKM signal 536. The SleepCLKM signal 536 may be provided to a D flip-flop 518b and a negative edge triggered D flip-flop 520b on the alarm module 508b of the modem integrated circuit (IC) 514.

The alarm module 508b may include a P-channel MOSFET 538. The source of the P-channel MOSFET 538 may be coupled to the rail voltage. The gate of the P-channel MOSFET 538 may be coupled to an output of the D flip-flop 518b. The D flip-flop 518b may thus provide a universal integrated circuit card (UICC) alarm out signal 530 to the P-channel MOSFET 538. The drain of the P-channel MOSFET 538 may be coupled to the alarm interface 510. The drain of the P-channel MOSFET 538 may also be coupled to the input of a driver 524c. The output of the driver 524c may be coupled to an input of the negative edge triggered D flip-flop 520b. The driver 524c may thus provide an alarm in signal 532 to the negative edge triggered D flip-flop 520b.

Figure 5:
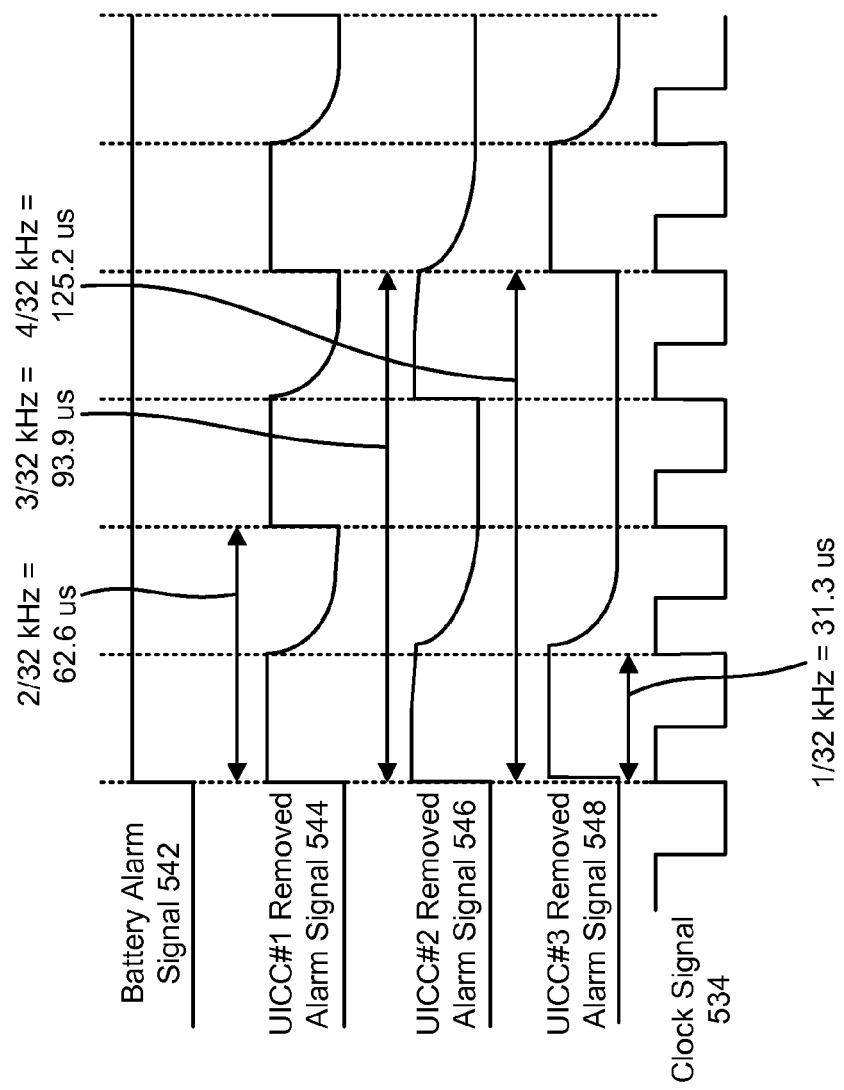
FIG. 5 is a graph illustrating examples of alarm waveforms used to signal an alarm event and the alarm event type on an alarm interface.

FIG. 5 is a graph illustrating examples of alarm waveforms used to signal an alarm event and the alarm event type on an alarm interface 110. By adjusting the frequency modulation of the alarm signal over an alarm interface 110, a first integrated circuit (IC) 106a may inform a second integrated circuit (IC) 106b of an alarm event and the type of the alarm event. For example, when a universal integrated circuit card (UICC) is removed from a wireless device 102, the modem integrated circuit (IC) 414 may inform the power management integrated circuit (PMIC) 412 that the specific universal integrated circuit card (UICC) has been removed so that the power management integrated circuit (PMIC) 412 can adjust the appropriate rail voltage to ground.

The battery alarm signal 542 across the alarm interface 110 is shown (for when a battery has been removed from the wireless device 102). At time 0, the battery alarm signal 542 may switch from a low signal to a high signal (indicating that the battery has been removed). The clock signal 534 is also shown. The clock signal 534 may have a frequency of 32 kHz.

At time 0, if the universal integrated circuit card (UICC) #1 is removed, the alarm signal 544 is frequency modulated as shown. Specifically, the alarm signal 544 switches to a high signal for one period of the clock signal $$\left(\frac{1}{32\text{ kHz}} = 31.3 \text{ }\mu\text{s}\right).$$

The alarm signal 544 may then discharge to a low signal over one period of the clock signal 534. Thus, the alarm signal 544 may have a period of $$\frac{2}{32\text{ kHz}} = 62.6 \text{ }\mu\text{s}.$$

The alarm signal 544 may repeat the previous two clock cycles until 32 clock cycles have elapsed (~1 millisecond (ms)).

At time 0, if the universal integrated circuit card (UICC) #2 is removed, the alarm signal 546 is frequency modulated as shown. Specifically, the alarm signal 546 switches to a high signal for one period of the clock signal 534. The alarm signal 546 may then discharge to a low signal over two periods of the clock signal 534. Thus, the alarm signal 546 may have a period of $$\frac{3}{32\text{ kHz}} = 93.9 \text{ }\mu\text{s}.$$

The alarm signal 546 may repeat the previous three clock signals until 32 clock cycles have elapsed.

At time 0, if the universal integrated circuit card (UICC) #3 is removed, the alarm signal 548 is frequency modulated as shown. Specifically, the alarm signal 548 switches to a high signal for one period of the clock signal 534. The alarm signal 548 may then discharge to a low signal over three periods of the clock signal 534. Thus, the alarm signal 548 may have a period of $$\frac{4}{32\text{ kHz}} = 126.2 \text{ }\mu\text{s}.$$

Figure 6:
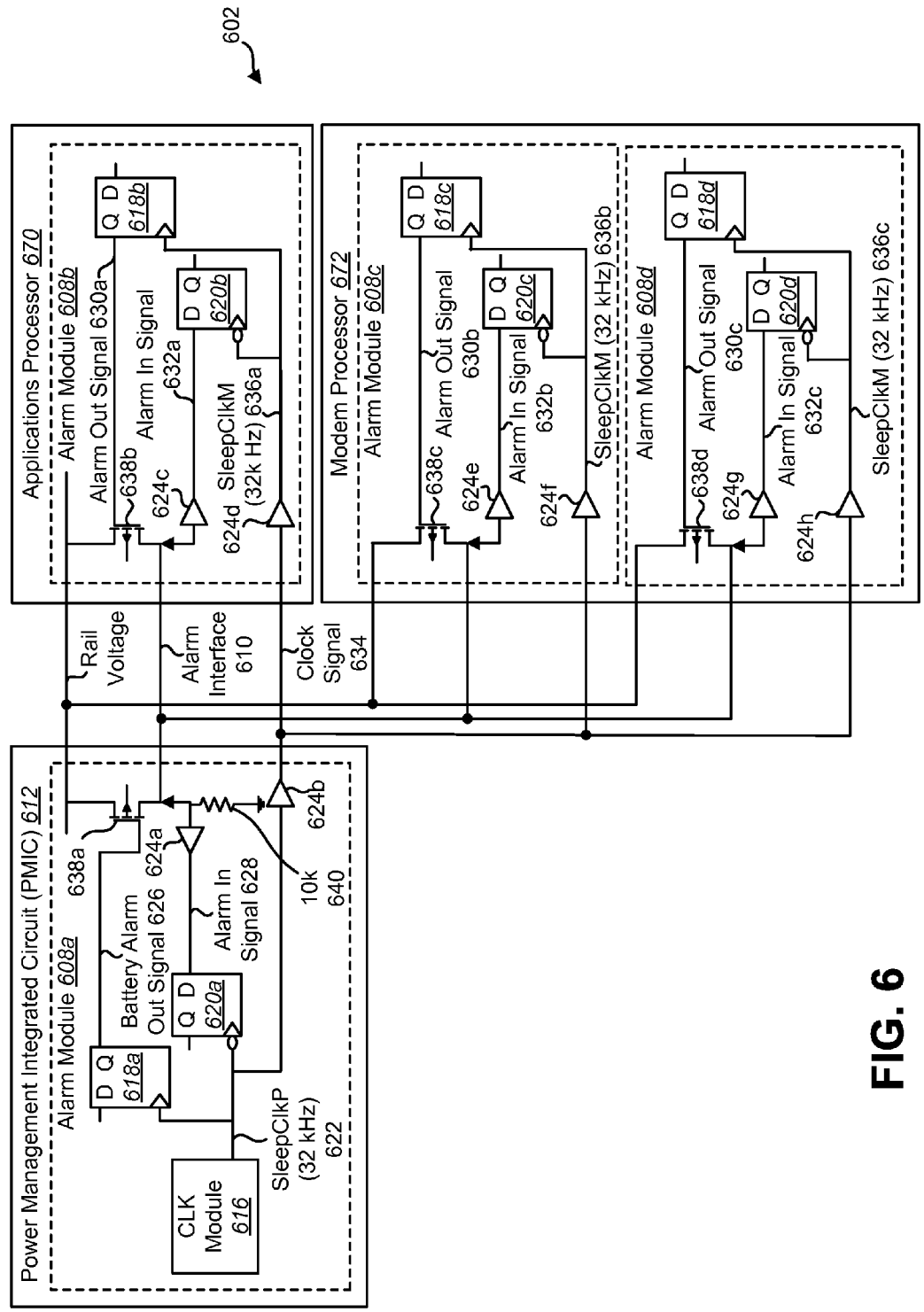
FIG. 6 is a block diagram illustrating an alarm interface between a power management integrated circuit (PMIC) and multiple mobile station modem (MSM)/universal integrated circuit card (UICC) blocks without interchip awareness.

FIG. 6 is a block diagram illustrating an alarm interface 610 between a power management integrated circuit (PMIC) 612 and multiple mobile station modem (MSM)/universal integrated circuit card (UICC) blocks without interchip awareness. An alarm interface 610 may be used between the power management integrated circuit (PMIC) 612 and both an applications processor 670 and a modem processor 672. The applications processor 670 and the modem processor 672 may be part of a mobile station modem (MSM) or on a modem integrated circuit (IC) 414. The modem processor 672 may include multiple alarm modules 608c-d for different universal integrated circuit cards (UICCs).

The power management integrated circuit (PMIC) 612 may include an alarm module 608a. The alarm module 608a may include a D flip-flop 618a, a negative edge triggered D flip-flop 620a and a CLK module 616. The CLK module 616 may generate a clock signal SleepCLKP 622 that is 32 kilohertz (kHz). The CLK module 616 may provide the clock signal SleepCLKP 622 to both the D flip-flop 618a and the negative edge triggered D flip-flop 620a. The D flip-flop 618a may provide a battery alarm out signal 626. The battery alarm out signal 626 may thus be an alarm signal generated by the power management integrated circuit (PMIC) 612. The battery alarm out signal 626 may be provided to the gate of a P-channel MOSFET 638a. The source of the P-channel MOSFET 638a may be coupled to a rail voltage. The drain of the P-channel MOSFET 638a may be coupled to an alarm interface 610 that couples the power management integrated circuit (PMIC) 612 to the applications processor 670 and the modem processor 672.

The drain of the P-channel MOSFET 638a may also be coupled to ground via a resistor 440. The resistor may be 10 kn. The drain of the P-channel MOSFET 638a may further be coupled to an input of a driver 624a. The output of the driver 624a may be coupled to the negative edge triggered D flip-flop 620a. The driver 624a may thus provide an alarm in signal 628 to the negative edge triggered D flip-flop 620a.

The power management integrated circuit (PMIC) 612, the applications processor 670 and the modem processor 672 may share the rail voltage, the alarm interface 610 and a clock signal 634. The clock signal SleepCLKP 622 may be passed through a driver 624b on the alarm module 608a of the power management integrated circuit (PMIC) 612 to obtain a clock signal 634. The clock signal 634 may then be provided to the alarm module 608b of the applications processor 670 and to the first alarm module 608c and second alarm module 608d of the modem processor 672.

The clock signal 634 may be passed through a driver 624d on the alarm module 608b of the applications processor 670 to obtain a SleepCLKM signal 636a. The SleepCLKM signal 636a may be provided to a D flip-flop 618b and an negative edge triggered D flip-flop 618b on the alarm module 608b of the applications processor 670.

The alarm module 608b of the applications processor 670 may include a P-channel MOSFET 638b. The source of the P-channel MOSFET 638b may be coupled to the rail voltage. The gate of the P-channel MOSFET 638b may be coupled to an output of the D flip-flop 618b. The D flip-flop 618b may thus provide a universal integrated circuit card (UICC) alarm out signal 630a to the P-channel MOSFET 638b. The drain of the P-channel MOSFET 638b may be coupled to the alarm interface 610. The drain of the P-channel MOSFET 638b may also be coupled to the input of a driver 624c. The output of the driver 624c may be coupled to an input of the negative edge triggered D flip-flop 620b. The driver 624c may thus provide an alarm in signal 632a to the negative edge triggered D flip-flop 618b.

The modem processor 672 may include multiple alarm modules 608c-d. For example, the modem processor 672 may include a first alarm module 608c and a second alarm module 608d. The clock signal 634 may be passed through a driver 624f on the first alarm module 608c of the modem processor 672 to obtain a SleepCLKM signal 636b. The SleepCLKM signal 636b may be provided to a D flip-flop 618c and a negative edge triggered D flip-flop 620d on the first alarm module 608c of the modem processor 672.

The first alarm module 608c of the modem processor 672 may include a P-channel MOSFET 638c. The source of the P-channel MOSFET 638c may be coupled to the rail voltage. The gate of the P-channel MOSFET 638c may be coupled to an output of the D flip-flop 618c. The D flip-flop 618c may thus provide a universal integrated circuit card (UICC) alarm out signal 630b to the P-channel MOSFET 638c. The drain of the P-channel MOSFET 638c may be coupled to the alarm interface 610. The drain of the P-channel MOSFET 638c may also be coupled to the input of a driver 624e. The output of the driver 624e may be coupled to an input of the negative edge triggered D flip-flop 620c. The driver 624e may thus provide an alarm in signal 632b to the negative edge triggered D flip-flop 620c.

The clock signal 634 may also be passed through a driver 624h on the second alarm module 608d of the modem processor 672 to obtain a SleepCLKM signal 636c. The SleepCLKM signal 636c may be provided to a D flip-flop 618d and a negative edge triggered D flip-flop 620d on the second alarm module 608d of the modem processor 672.

The second alarm module 608d of the modem processor 672 may include a P-channel MOSFET 638d. The source of the P-channel MOSFET 638d may be coupled to the rail voltage. The gate of the P-channel MOSFET 638d may be coupled to an output of the D flip-flop 618d. The D flip-flop 618d may thus provide a universal integrated circuit card (UICC) alarm out signal 630c to the P-channel MOSFET 638d. The drain of the P-channel MOSFET 638d may be coupled to the alarm interface 610. The drain of the P-channel MOSFET 638d may also be coupled to the input of a driver 624g. The output of the driver 624g may be coupled to an input of the negative edge triggered D flip-flop 620d. The driver 624g may thus provide an alarm in signal 632c to the negative edge triggered D flip-flop 620d.

The alarm interface 610 may instead be implemented using active low logic (not shown). For active low logic, the resistor 640 may be coupled between the alarm interface 610 and the rail voltage. The P-channel MOSFET 638a may be replaced with an N-channel MOSFET that is coupled between the alarm interface 610 and ground. Thus, like the alarm interface 510 of FIG. 4B, the alarm interface 610 may be pulled low during alarm events (and the alarm module 608a is active low instead of active high).

Figure 7:
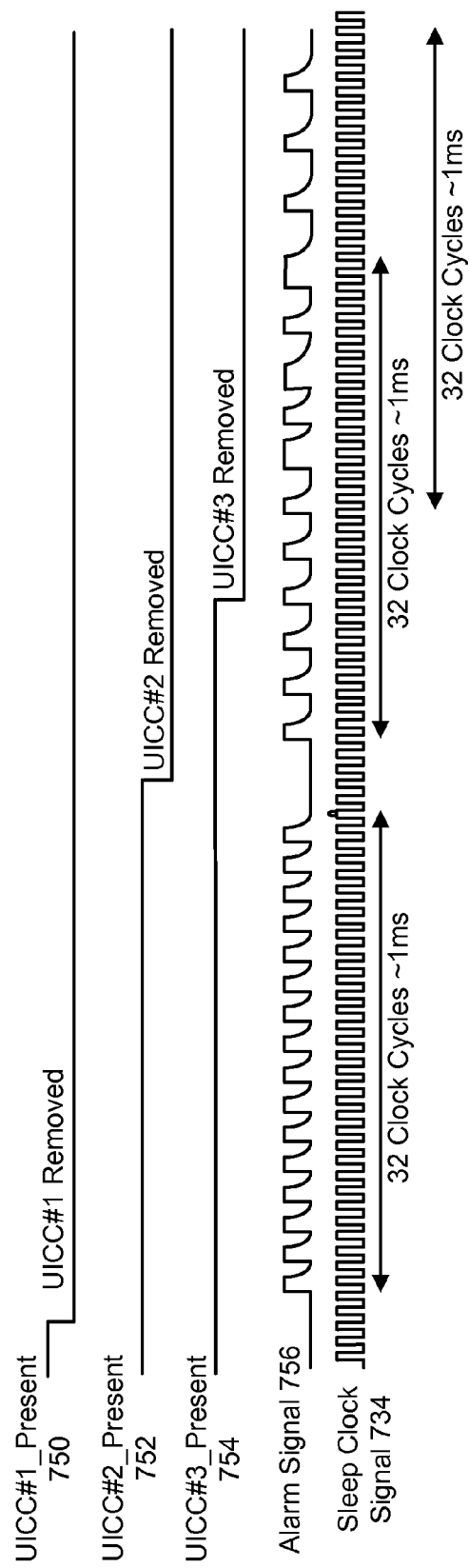
FIG. 7 is a graph illustrating the use of multiple universal integrated circuit card (UICC) alarms without contention detection.

FIG. 7 is a graph illustrating the use of multiple universal integrated circuit card (UICC) alarms without contention detection. The graphs of FIG. 7 may also apply for configurations where there is one alarm module 108 on the modem that is servicing multiple universal integrated circuit cards (UICCs) when more than one universal integrated circuit cards (UICCs) are removed at the same time. If contention detection is not implemented, the alarm module 108 associated with a universal integrated circuit card (UICC) does not wait for the alarm interface 110 to be clear (i.e., for other alarms to finish their cycle) before beginning transmission of an alarm signal 756. In the graph, the presence of universal integrated circuit card (UICC) #1 750, universal integrated circuit card (UICC) #2 752 and universal integrated circuit card (UICC) #3 754 is illustrated. The sleep clock 734 and the alarm signal 756 are also illustrated.

The universal integrated circuit card (UICC) #1 may be removed from the wireless device 102. Soon after universal integrated circuit card (UICC) #1 is removed, the alarm signal 756 may be frequency modulated to indicate that universal integrated circuit card (UICC) #1 has been removed. The alarm signal 756 for universal integrated circuit card (UICC) #1 may occur for 32 clock cycles. The alarm signal 756 may then return to low. When universal integrated circuit card (UICC) #2 is removed from the wireless device 102, the alarm signal 756 may be frequency modulated to indicate that universal integrated circuit card (UICC) #2 has been removed. The alarm signal 756 for universal integrated circuit card (UICC) #2 may occur for 32 clock cycles. However, if universal integrated circuit card (UICC) #3 is removed before the alarm signal 756 for universal integrated circuit card (UICC) #2 is finished (i.e., universal integrated circuit card (UICC) #3 is removed within 1 ms of universal integrated circuit card (UICC) #2 being removed), then the alarm signal 756 for universal integrated circuit card (UICC) #3 is frequency modulated without waiting for the alarm signal 756 for universal integrated circuit card (UICC) #2 to finish. In other words, the most recent alarm event may take priority on the alarm signal 756. Contention detection may not need to be implemented, since it is highly unlikely that a user can remove two universal integrated circuit cards (UICCs) from a wireless device 102 within 1 ms of each other.

Figure 8:
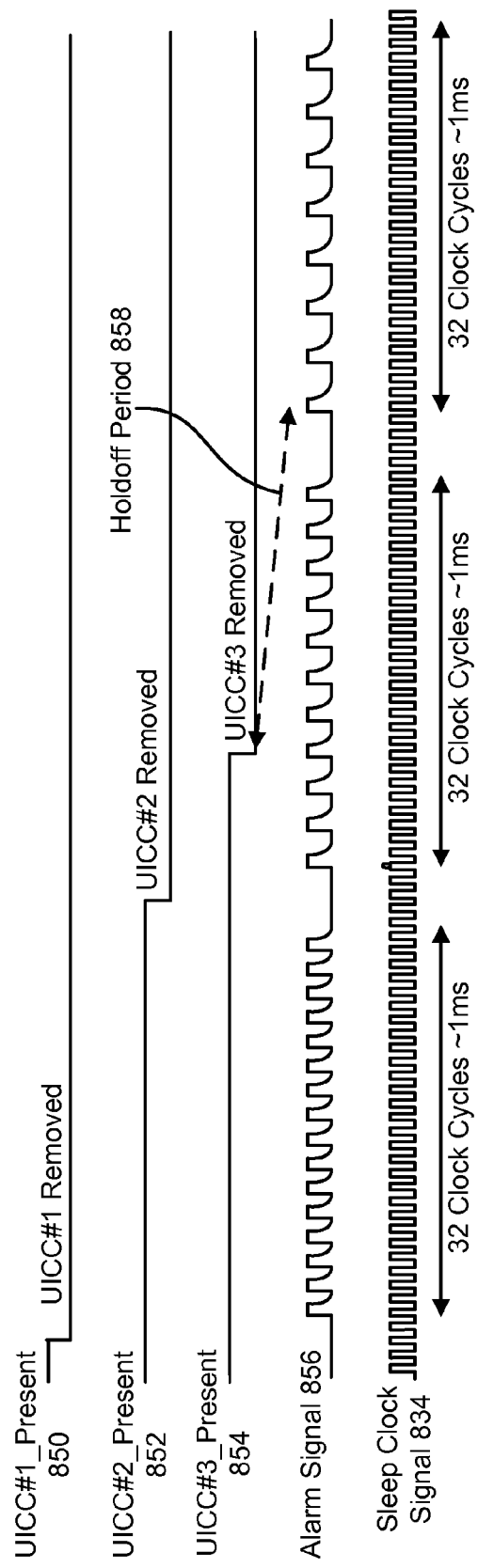
FIG. 8 is a graph illustrating the use of multiple universal integrated circuit card (UICC) alarms with contention detection.

FIG. 8 is a graph illustrating the use of multiple universal integrated circuit card (UICC) alarms with contention detection. If contention detection is implemented, each alarm module 108 associated with a universal integrated circuit card (UICC) waits for the alarm interface 110 to be clear (i.e. for other alarms to finish their cycle) before beginning transmission of an alarm signal 856. In the graph, the presence of universal integrated circuit card (UICC) #1 850, universal integrated circuit card (UICC) #2 852 and universal integrated circuit card (UICC) #3 854 is illustrated. The sleep clock 834 and the alarm signal 856 are also illustrated.

The universal integrated circuit card (UICC) #1 may be removed from the wireless device 102. Soon after universal integrated circuit card (UICC) #1 is removed, the alarm signal 756 may be frequency modulated to indicate that universal integrated circuit card (UICC) #1 has been removed. The alarm signal 756 for universal integrated circuit card (UICC) #1 may occur for 32 clock cycles. The alarm signal 756 may then return to low. When universal integrated circuit card (UICC) #2 is removed from the wireless device 102, the alarm signal 756 may be frequency modulated to indicate that universal integrated circuit card (UICC) #2 has been removed. The alarm signal 756 for universal integrated circuit card (UICC) #2 may occur for 32 clock cycles. However, if universal integrated circuit card (UICC) #3 is removed before the alarm signal 756 for universal integrated circuit card (UICC) #2 is finished (i.e., universal integrated circuit card (UICC) #3 is removed within 1 ms of universal integrated circuit card (UICC) #2 being removed), then the alarm signal 756 for universal integrated circuit card (UICC) #3 is delayed for a holdoff period 858 before the alarm signal 756 for universal integrated circuit card (UICC) #3 is frequency modulated. The use of contention detection may reduce the error window down to 33 μs. It is extremely unlikely that a user can remove two universal integrated circuit cards (UICCs) from a wireless device 102 within 33 μs of each other.

The alarm controller may sequence the universal integrated circuit cards (UICCs) if there is one alarm controller for multiple universal integrated circuit cards (UICCs). If there is one alarm controller per universal integrated circuit card (UICC), the alarm controller may sense if the alarm signal 856 is active by counting for a maximum number of alarm modules supported multiplied by one sleep clock period before sending the alarm. In one configuration, the alarm controller can continuously monitor the alarm signal 856 to see if another alarm is active. In another configuration, the alarm controller may just let contention take place (since it is rare and unlikely that two alarm events will happen within 1 ms of each other).

Figure 9:
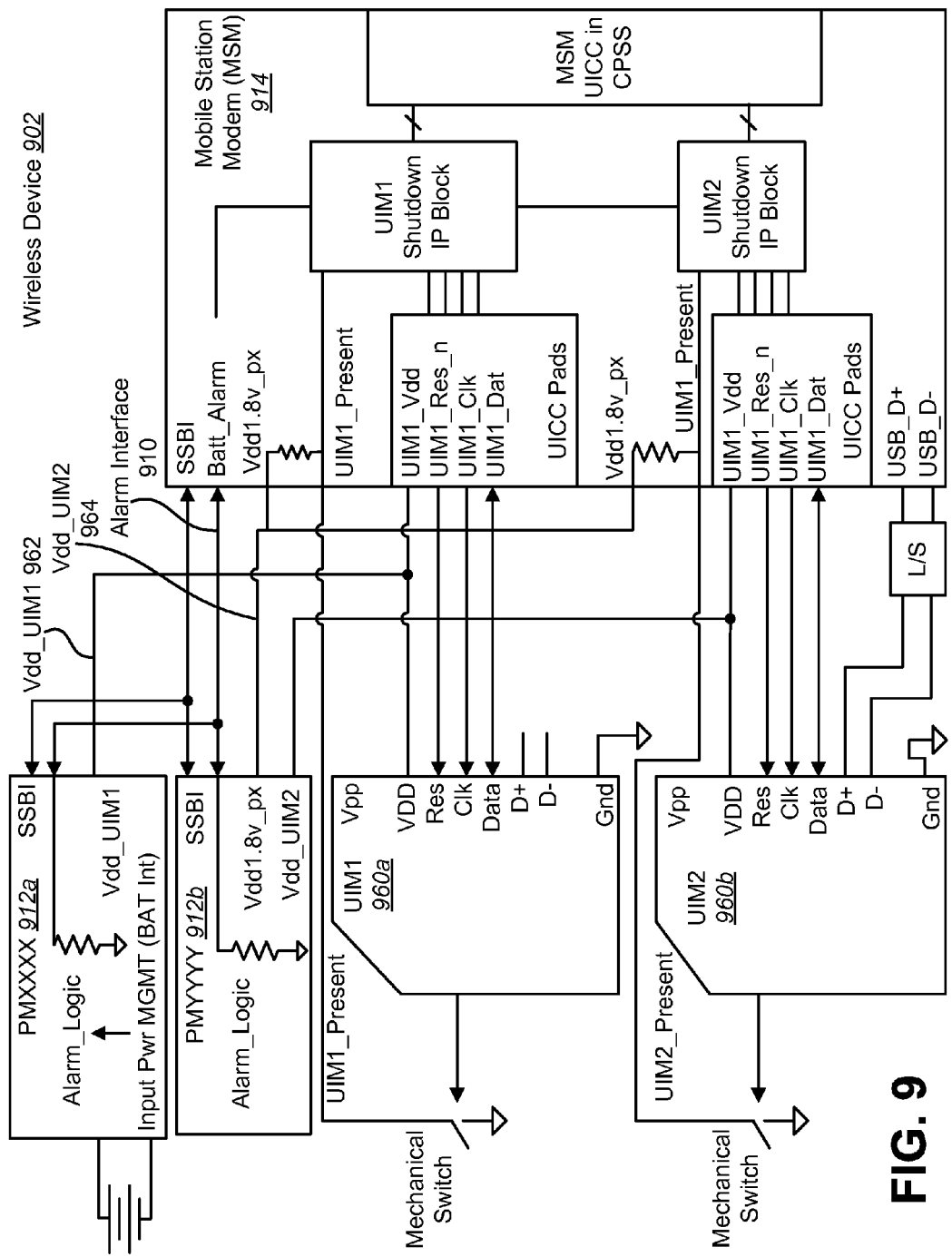
FIG. 9 is a block diagram illustrating another wireless device for use in the present systems and methods.

FIG. 9 is a block diagram illustrating another wireless device 902 for use in the present systems and methods. The wireless device 902 of FIG. 9 may be one configuration of the wireless device 102 of FIG. 1. The wireless device 902 may support hotswappable universal integrated circuit cards (UICCs) 960a-b.

The wireless device 902 may include a first power management integrated circuit (PMIC) PMXXXX 912a and a second power management integrated circuit (PMIC) PMYYYY 912b. The first power management integrated circuit (PMIC) 912a may provide power management for a first universal integrated circuit card (UICC) UIM1 960a. The first power management integrated circuit (PMIC) 912a may include alarm logic and input power management. The alarm logic may allow the first power management integrated circuit (PMIC) 912a to pull the rail voltage to ground when the first universal integrated circuit card (UICC) UIM1 960a is removed from the wireless device 902. The single-wire serial bus interface (SSBI) of the first power management integrated circuit (PMIC) 912a may be coupled to the single-wire serial bus interface (SSBI) of the second power management integrated circuit (PMIC) 912b and the single-wire serial bus interface (SSBI) of the mobile station modem (MSM) 914. The first power management integrated circuit (PMIC) 912a may include a rail voltage Vdd_UIM1 962 that is coupled to VDD on the first universal integrated circuit card (UICC) UIM1 960a and to universal integrated circuit card (UICC) pads on the mobile station modem (MSM) 914.

The second power management integrated circuit (PMIC) 912b may provide power management for a second universal integrated circuit card (UICC) UIM2 960b. The second power management integrated circuit (PMIC) 912b may include alarm logic that allows the second power management integrated circuit (PMIC) 912b to pull the rail voltage to ground when the second universal integrated circuit card (UICC) UIM2 960b is removed from the wireless device 102. The second power management integrated circuit (PMIC) 912b may include a rail voltage Vdd_UIM2 964 that is coupled to VDD on the second universal integrated circuit card (UICC) UIM2 960b and to universal integrated circuit card (UICC) pads on the mobile station modem (MSM) 914.

The mobile station modem (MSM) 914 may detect the presence of a universal integrated circuit card (UICC) 960 via a mechanical switch. Thus, when a universal integrated circuit card (UICC) 960 is removed from the wireless device 902, the mobile station modem (MSM) 914 may detect the removal of the universal integrated circuit card (UICC) 960 and use the alarm interface 910 to signal to the power management integrated circuits (PMIC) 912 that the universal integrated circuit card (UICC) 960 has been removed. Because the power management integrated circuits (PMICs) 912 are in a wafer-level package (WLP), pins are a scarce resource. To reduce pins, the mobile station modem (MSM) 914 may be directly connected to the removable user identity module (RUIM) Reset, Clk and Data lines using onchip 2.85/1.8v level shifters. Thus, signaling the type of alarm event using frequency modulation on the alarm interface 910 may provide benefits to the wireless device 902, since the use of extra pins on the power management integrated circuit (PMIC) 912 and on the mobile station modem (MSM) 914 reduces the possible number of universal integrated circuit cards (UICCs) 960 that can be used by the wireless device 902.

Figure 10:
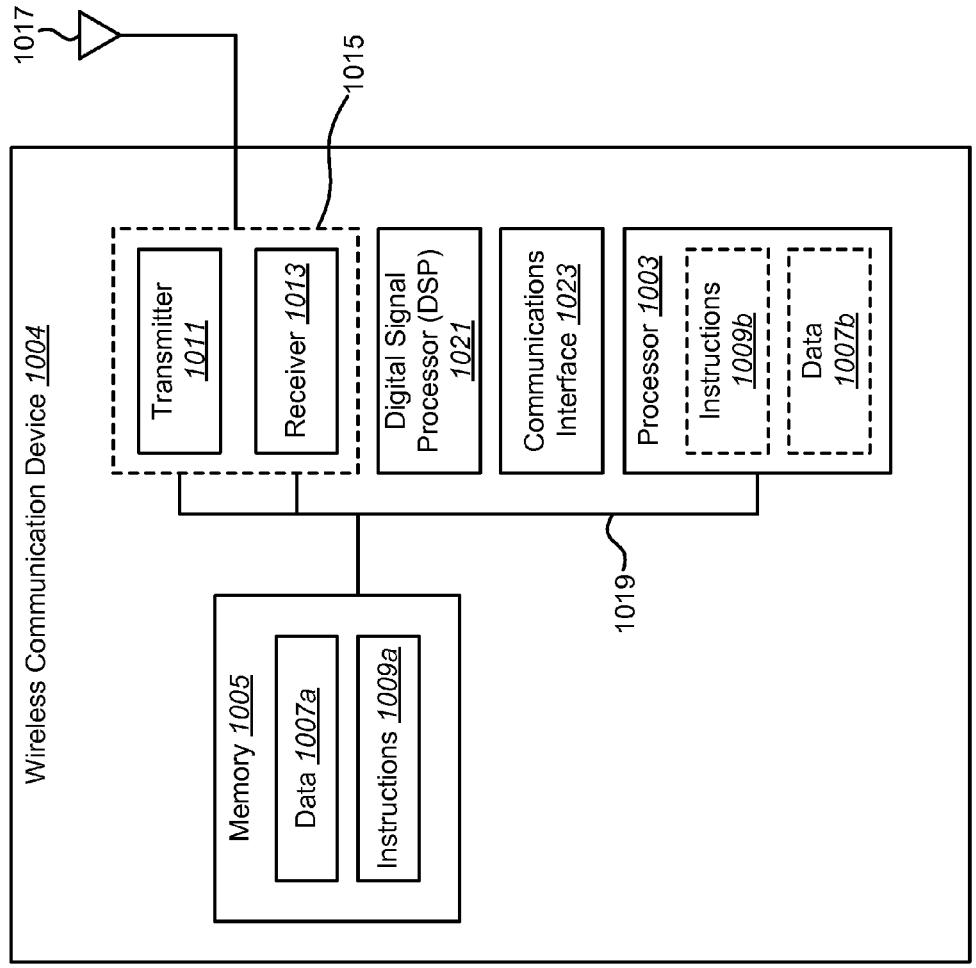
FIG. 10 illustrates certain components that may be included within a wireless communication device.

FIG. 10 illustrates certain components that may be included within a wireless communication device 1004. The wireless communication device 1004 may be an access terminal, a mobile station, a user equipment (UE), etc. The wireless communication device 1004 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1004 of FIG. 10, in an alternative configuration, a combination of processors (e.g., an ARM and DSP) could be used.

The wireless communication device 1004 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007*a* and instructions 1009*a* may be stored in the memory 1005. The instructions 1009*a* may be executable by the processor 1003 to implement the methods disclosed herein. Executing the instructions 1009*a* may involve the use of the data 1007*a* that is stored in the memory 1005. When the processor 1003 executes the instructions 1009, various portions of the instructions 1009*b* may be loaded onto the processor 1003, and various pieces of data 1007*b* may be loaded onto the processor 1003.

The wireless communication device 1004 may also include a transmitter 1011 and a receiver 1013 to allow transmission and reception of signals to and from the wireless communication device 1004 via an antenna 1017. The transmitter 1011 and receiver 1013 may be collectively referred to as a transceiver 1015. The wireless communication device 1004 may also include (not shown) multiple transmitters, multiple antennas, multiple receivers and/or multiple transceivers.

The wireless communication device 1004 may include a digital signal processor (DSP) 1021. The wireless communication device 1004 may also include a communications interface 1023. The communications interface 1023 may allow a user to interact with the wireless communication device 1004.

The various components of the wireless communication device 1004 may be coupled together by one or more buses, which may include a power bus, a control signal bus, a status signal bus, a data bus, etc. For the sake of clarity, the various buses are illustrated in FIG. 10 as a bus system 1019.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An apparatus configured for providing communication between integrated circuits, comprising:
   a first integrated circuit, wherein the first integrated circuit comprises:
      a clock module;
      a first D flip-flop;
      a first negative edge triggered D flip-flop; and
      a first P-channel transistor, wherein the clock module provides a sleep clock signal to the first D flip-flop and the first negative edge triggered D flip-flop, wherein the first D flip-flop provides a battery alarm out signal to a gate of the first P-channel transistor, and wherein the first negative edge triggered D flip-flop receives an alarm in signal from a drain of the first P-channel transistor via a driver;
   a second integrated circuit;
   an alarm interface that couples the first integrated circuit to the second integrated circuit, wherein an alarm signal is sent on the alarm interface to signal an alarm event, wherein the alarm signal is modulated differently based on a type of the alarm event, and wherein the drain of the first P-channel transistor is coupled to the alarm interface.

2. The apparatus of claim 1, wherein the first integrated circuit is a first type and the second integrated circuit is a second type.

3. The apparatus of claim 1, wherein the apparatus is a wireless communication device.

4. The apparatus of claim 1, wherein the alarm interface is coupled between a single pin on the first integrated circuit and a single pin on the second integrated circuit.

5. The apparatus of claim 1, wherein the first integrated circuit is a power management integrated circuit, and wherein the second integrated circuit is a modem integrated circuit.

6. The apparatus of claim 1, wherein the second integrated circuit comprises:
   a second D flip-flop;
   a second negative edge triggered D flip-flop; and
   a second P-channel transistor.

7. The apparatus of claim 6, wherein the clock module provides a sleep clock signal to the second D flip-flop and the second negative edge triggered D flip-flop via a driver on the first integrated circuit and a first driver on the second integrated circuit, wherein the first D flip-flop provides a universal integrated circuit card alarm out signal to a gate of the second P-channel transistor, and wherein the second negative edge triggered D flip-flop receives an alarm in signal from a drain of the second P-channel transistor via a second driver on the second integrated circuit.

8. The apparatus of claim 7, wherein the drain of the second P-channel transistor is coupled to the alarm interface.

9. The apparatus of claim 6, further comprising a third integrated circuit, wherein the alarm interface couples the first integrated circuit to the third integrated circuit, wherein the third integrated circuit comprises:
   a third D flip-flop;
   a third negative edge triggered D flip-flop;
   a third P-channel transistor;
   a fourth D flip-flop;
   a fourth negative edge triggered D flip-flop; and
   a fourth P-channel transistor.

10. The apparatus of claim 9, wherein the clock module provides a sleep clock signal to the third integrated circuit via a driver on the first integrated circuit, wherein the driver on the first integrated circuit provides the sleep clock signal to the third D flip-flop and the third negative edge triggered D flip-flop via a first driver on the third integrated circuit, wherein the driver on the first integrated circuit provides the sleep clock signal to the fourth D flip-flop and the fourth negative edge triggered D flip-flop via a second driver on the third integrated circuit, wherein the third D flip-flop provides a first universal integrated circuit card alarm out signal to a gate of the third P-channel transistor, wherein the fourth D flip-flop provides a second universal integrated circuit card alarm out signal to a gate of the fourth P-channel transistor, wherein the third negative edge triggered D flip-flop receives a first alarm in signal from a drain of the third P-channel transistor via a third driver on the third integrated circuit, and wherein the fourth negative edge triggered D flip-flop receives a second alarm in signal from a drain of the fourth P-channel transistor via a fourth driver on the third integrated circuit.

11. The apparatus of claim 10, wherein the drain of the third P-channel transistor and the drain of the fourth P-channel transistor are coupled to the alarm interface.

12. The apparatus of claim 9, wherein the first integrated circuit is a power management integrated circuit, wherein the second integrated circuit is an applications processor, and wherein the third integrated circuit is a modem processor.

13. The apparatus of claim 1, wherein the type of alarm event is one of a universal integrated circuit card being removed from the apparatus, a subscriber identification module card being removed from the apparatus, a secure digital card being removed from the apparatus, and a battery being removed from the apparatus.

14. The apparatus of claim 1, wherein the alarm interface for each integrated circuit is implemented with hardware.

15. The apparatus of claim 1, wherein the alarm interface for each integrated circuit is implemented with software.

16. The apparatus of claim 1, wherein the alarm signal is modulated using one of pulse width modulation, pulse position modulation and frequency modulation.

17. A method for providing communication between integrated circuits, comprising:
   receiving an alarm signal via an alarm interface, wherein the alarm signal is sent on the alarm interface to signal an alarm event, and wherein the alarm signal is modulated differently based on a type of the alarm event;
   determining a modulation of the alarm signal; and
   determining the type of the alarm event of the alarm signal using the modulation, wherein the method is performed by a first integrated circuit, and wherein the alarm signal is received from a second integrated circuit, wherein the first integrated circuit comprises:
      a first D flip-flop;
      a first negative edge triggered D flip-flop; and
      a first P-channel transistor and wherein the second integrated circuit comprises:
         a second D flip-flop;
         a second negative edge triggered D flip-flop; and
         a second P-channel transistor;
   wherein a clock module provides a sleep clock signal to the first D flip-flop, the second D flip-flop, the first negative edge triggered D flip-flop and the second negative edge triggered D flip-flop, wherein a first driver and a second driver are used for the D flip-flop and the negative edge triggered D flip-flop that are not located on the same integrated circuit as the clock module, wherein the first D flip-flop provides a first alarm out signal to a gate of the first P-channel transistor, wherein the second D flip-flop provides a second alarm out signal to a gate of the second P-channel transistor, wherein the first negative edge triggered D flip-flop receives a first alarm in signal from a drain of the first P-channel transistor via a third driver, and wherein the second negative edge triggered D flip-flop receives a second alarm in signal from a drain of the second P-channel transistor via a fourth driver.

18. The method of claim 17, wherein the first integrated circuit is a first type and the second integrated circuit is a second type.

19. The method of claim 17, wherein the first integrated circuit is a power management integrated circuit, and wherein the second integrated circuit is a modem integrated circuit.

20. The method of claim 17, wherein the first integrated circuit is a modem integrated circuit, and wherein the second integrated circuit is a power management integrated circuit.

21. The method of claim 17, wherein a drain of the first P-channel transistor is coupled to the alarm interface, and wherein a drain of the second P-channel transistor is coupled to the alarm interface.

22. The method of claim 17, wherein the first integrated circuit and the second integrated circuit are in a wireless communication device.

23. The method of claim 22, wherein the type of alarm event is one of a universal integrated circuit card being removed from the wireless communication device, a subscriber identification module card being removed from the wireless communication device, a secure digital card being removed from the wireless communication device, and a battery being removed from the wireless communication device.

24. The method of claim 17, wherein the alarm interface is coupled between a single pin on the first integrated circuit and a single pin on the second integrated circuit.

25. The method of claim 17, wherein the alarm interface for each integrated circuit is implemented with hardware.

26. The method of claim 17, wherein the alarm interface for each integrated circuit is implemented with software.

27. The method of claim 17, wherein the alarm signal is modulated using one of pulse width modulation, pulse position modulation and frequency modulation.

28. A method for providing communication between integrated circuits, comprising:
    detecting an alarm event by a first integrated circuit;
    generating an alarm signal that is modulated based on a type of the alarm event; and
    sending the alarm signal to a second integrated circuit via an alarm interface, wherein the first integrated circuit is a modem integrated circuit, and wherein the second integrated circuit is a power management integrated circuit, wherein the first integrated circuit comprises:
    a first D flip-flop;
    a first negative edge triggered D flip-flop; and
    a first P-channel transistor and wherein the second integrated circuit comprises:
        a second D flip-flop;
        a second negative edge triggered D flip-flop; and
        a second P-channel transistor;
    wherein a clock module provides a sleep clock signal to the first D flip-flop, the second D flip-flop, the first negative edge triggered D flip-flop and the second negative edge triggered D flip-flop, wherein a first driver and a second driver are used for the D flip-flop and the negative edge triggered D flip-flop that are not located on the same integrated circuit as the clock module, wherein the first D flip-flop provides a first alarm out signal to a gate of the first P-channel transistor, wherein the second D flip-flop provides a second alarm out signal to a gate of the second P-channel transistor, wherein the first negative edge triggered D flip-flop receives a first alarm in signal from a drain of the first P-channel transistor via a third driver, and wherein the second negative edge triggered D flip-flop receives a second alarm in signal from a drain of the second P-channel transistor via a fourth driver.

29. The method of claim 28, wherein a drain of the first P-channel transistor is coupled to the alarm interface, and wherein the drain of the second P-channel transistor is coupled to the alarm interface.

30. The method of claim 28, wherein the first integrated circuit and the second integrated circuit are in a wireless communication device.

31. The method of claim 30, wherein the type of alarm event is one of a universal integrated circuit card being removed from the wireless communication device, a subscriber identification module card being removed from the wireless communication device, a secure digital card being removed from the wireless communication device, and a battery being removed from the wireless communication device.

32. The method of claim 28, wherein the alarm interface is coupled between a single pin on the first integrated circuit and a single pin on the second integrated circuit.

33. The method of claim 28, wherein the alarm interface for each integrated circuit is implemented with hardware.

34. The method of claim 28, wherein the alarm interface for each integrated circuit is implemented with software.

35. The method of claim 28, wherein the alarm signal is modulated using one of pulse width modulation, pulse position modulation and frequency modulation.

36. A computer-program product for providing communication between integrated circuits, the computer-program product comprising a non-transitory computer-readable medium having instructions thereon, the instructions comprising:
    code for causing a first integrated circuit to receive an alarm signal via an alarm interface, wherein the alarm signal is sent on the alarm interface to signal an alarm event, and wherein the alarm signal is modulated differently based on a type of the alarm event;
    code for causing the first integrated circuit to determine a modulation of the alarm signal; and
    code for causing the first integrated circuit to determine the type of the alarm event of the alarm signal using the modulation, wherein the alarm signal is received from a second integrated circuit, wherein the first integrated circuit comprises:
    a first D flip-flop;
    a first negative edge triggered D flip-flop; and
    a first P-channel transistor and wherein the second integrated circuit comprises:
        a second D flip-flop;
        a second negative edge triggered D flip-flop; and
        a second P-channel transistor;
    wherein a clock module provides a sleep clock signal to the first D flip-flop, the second D flip-flop, the first negative edge triggered D flip-flop and the second negative edge triggered D flip-flop, wherein a first driver and a second driver are used for the D flip-flop and the negative edge triggered D flip-flop that are not located on the same integrated circuit as the clock module, wherein the first D flip-flop provides a first alarm out signal to a gate of the first P-channel transistor, wherein the second D flip-flop provides a second alarm out signal to a gate of the second P-channel transistor, wherein the first negative edge triggered D flip-flop receives a first alarm in signal from a drain of the first P-channel transistor via a third driver, and wherein the second negative edge triggered D flip-flop receives a second alarm in signal from a drain of the second P-channel transistor via a fourth driver.

37. A computer-program product for providing communication between integrated circuits, the computer-program product comprising a non-transitory computer-readable medium having instructions thereon, the instructions comprising:

code for causing a first integrated circuit to detect an alarm event by a first integrated circuit;

code for causing the first integrated circuit to generate an alarm signal that is frequency modulated based on a type of the alarm event; and code for causing the first integrated circuit to send the alarm signal to a second integrated circuit via an alarm interface, wherein the first integrated circuit is a modem integrated circuit, and wherein the second integrated circuit is a power management integrated circuit, wherein the first integrated circuit comprises:

a first D flip-flop;
a first negative edge triggered D flip-flop; and
a first P-channel transistor and wherein the second integrated circuit comprises:
a second D flip-flop;
a second negative edge triggered D flip-flop; and
a second P-channel transistor;

wherein a clock module provides a sleep clock signal to the first D flip-flop, the second D flip-flop, the first negative edge triggered D flip-flop and the second negative edge triggered D flip-flop, wherein a first driver and a second driver are used for the D flip-flop and the negative edge triggered D flip-flop that are not located on the same integrated circuit as the clock module, wherein the first D flip-flop provides a first alarm out signal to a gate of the first P-channel transistor, wherein the second D flip-flop provides a second alarm out signal to a gate of the second P-channel transistor, wherein the first negative edge triggered D flip-flop receives a first alarm in signal from a drain of the first P-channel transistor via a third driver, and wherein the second negative edge triggered D flip-flop receives a second alarm in signal from a drain of the second P-channel transistor via a fourth driver.

* * * * *